United States Patent
Banerjee et al.

(10) Patent No.: US 9,952,900 B1
(45) Date of Patent: Apr. 24, 2018

(54) RUN TIME TASK SCHEDULING BASED ON METRICS CALCULATED BY MICRO CODE ENGINE IN A SOCKET

(71) Applicant: INTERNATIONAL BUSINESS MACHINES CORPORATION, Armonk, NY (US)

(72) Inventors: Pradipta K. Banerjee, Bangalore (IN); Aneesh K. Kizhake Veetil, Bangalore (IN); Dipankar Sarma, Bangalore (IN); Vaidyanathan Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/366,024

(22) Filed: Dec. 1, 2016

(51) Int. Cl.
- G06F 9/46 (2006.01)
- G06F 9/48 (2006.01)
- G06F 9/22 (2006.01)
- G06F 9/50 (2006.01)

(52) U.S. Cl.
CPC .......... G06F 9/4881 (2013.01); G06F 9/223 (2013.01); G06F 9/505 (2013.01)

(58) Field of Classification Search
CPC ......... G06F 9/4881; G06F 9/223; G06F 9/505
See application file for complete search history.

(56) References Cited

U.S. PATENT DOCUMENTS

| | | | |
|---|---|---|---|
| 7,487,317 B1 | 2/2009 | Fedorova et al. | |
| 7,996,839 B2 | 8/2011 | Farkas et al. | |
| 8,302,098 B2 | 10/2012 | Johnson et al. | |
| 2009/0164759 A1* | 6/2009 | Bell, Jr. | G06F 9/3842 712/216 |
| 2009/0165004 A1 | 6/2009 | Moses et al. | |
| 2009/0307697 A1* | 12/2009 | Hurley | G06F 9/4881 718/102 |
| 2011/0055838 A1 | 3/2011 | Moyes | |
| 2011/0302372 A1* | 12/2011 | Fontenot | G06F 9/3851 711/122 |
| 2014/0059553 A1* | 2/2014 | Chandhoke | G06F 9/4843 718/102 |

(Continued)

OTHER PUBLICATIONS

IBM: List of IBM Patents or Patent Applications Treated as Related (Appendix P), Oct. 12, 2017, pp. 1-2.

(Continued)

*Primary Examiner* — James J Lee
(74) *Attorney, Agent, or Firm* — Michael O'Keefe (57) ABSTRACT

A scheduler allocating a task to a socket, where the socket comprises a plurality of processor cores and a micro code engine. The scheduler receives metrics from the micro code engine, where the metrics are calculated by the micro code engine based on data receive from an event counter located on each of the plurality of processor cores. The scheduler determines whether a socket level load is below a socket threshold. Based on determining that the socket level load is below the socket threshold value, the scheduler determines whether a core level load is below a core threshold value. Based on determining that the core level load is below the core threshold value, the scheduler determines whether there is an available thread and based on determining that there is an available thread, the scheduler assigns the task to the available thread.

20 Claims, 3 Drawing Sheets

(56) References Cited

U.S. PATENT DOCUMENTS

| | | |
|---|---|---|
| 2014/0297833 A1 | 10/2014 | Bedini et al. |
| 2015/0192979 A1 | 7/2015 | Ghose |
| 2016/0253217 A1 | 9/2016 | Shows |
| 2017/0010920 A1 | 1/2017 | Abouzour et al. |
| 2017/0193136 A1* | 7/2017 | Prasad .................. G06F 17/505 |

OTHER PUBLICATIONS

Banerjee et al., Pending U.S. Appl. No. 15/711,072, filed Sep. 21, 2017, titled "Run Time Task Scheduling", pp. 1-19.

Tillenius et al., "Resource-Aware Task Scheduling," ACM Transactions on Embedded Computing Systems, vol. 14, No. 1, Article 5, Publication date: Jan. 5, 2015, pp. 1-25.

* cited by examiner

RUN TIME TASK SCHEDULING BASED ON METRICS CALCULATED BY MICRO CODE ENGINE IN A SOCKET

BACKGROUND

The present invention relates generally to scheduling tasks by an operating system running on multi-core multi-threaded environment and more particularly to measuring a run-time task load on a core with hardware assist and distributing tasks according to a core load in order to balance the load and improve system performance.

Typically, an operating system is executed on a computer system that incorporates a processor chip connected to a logical board via a socket. Computer systems, such as file servers, may have a multi socket configuration where more than one socket is allocated for a chip.

A chip connected via socket, typically, has more than one core. Each core is a separate central processing unit (CPU) that is configured to execute tasks that are managed by the operating system. A task is a basic group of commands that may be executed on a CPU.

Each core in multi-threading environment may be configured to execute several tasks while each task is executed on a separate thread of the same core. A thread may be created by time-slice usage of a single core, thus each thread of a multi-threaded processor appeared to the operating system as a processor.

In order to distribute tasks effectively, the operating system has a scheduling module called a scheduler. Scheduler is a software program that is configured to allocate each task that is scheduled to be executed in a run queue to a thread in a multi-threaded environment. A scheduler uses metrics to estimate a load on a thread by analyzing the length of a run time associated with a task. For example, Linux kernel scheduler uses metrics that accounts for past behavior of a thread when the same task was executed on the thread.

SUMMARY

Embodiments of the present invention provide a system, method, and program product for a run-time operating system task scheduling. A scheduler allocating a task to a socket, wherein the socket comprises a plurality of processor cores and a micro code engine. The scheduler receives metrics from the micro code engine, wherein the metrics are calculated by the micro code engine based on data receive from an event counter located on each of the plurality of processor cores. The scheduler determines whether a socket level load is below a socket threshold value, wherein the socket level load is determined from the metrics received from the micro code engine. Based on determining that the socket level load is below the socket threshold value, the scheduler determines whether a core level load is below a core threshold value, wherein the core level load is determined from the metrics received from the micro code engine. Based on determining that the core level load is below the core threshold value, the scheduler determines whether there is an available thread and based on determining that there is an available thread the scheduler assigns the task to the available thread.

DETAILED DESCRIPTION

Operating systems distribute tasks using a scheduling program, or a scheduler. The scheduler distributes the tasks among available threads using different metrics to estimate the actual core load in order to effectively distribute the load equally between the threads. Different metrics take into account a run queue, a priority of each task and a previous performance of the task on a thread.

These metrics may not provide effective performance results because threads may share the same core, therefore the same physical resources may be used by several threads causing one thread to affect all the other threads that are executed on the same core. Moreover, simultaneous multi-threading (SMT) technology enables dynamic changes to a number of threads that are executed in the same core. For example, for certain tasks, a core may be switched from running in 8 threaded mode to 1 threaded mode and execute the tasks faster serially instead of in parallel. This change may be advantageous when executing tasks that are using a majority of the core resources so that adding additional tasks to that core does not result in an improvement in the core performance.

Core load may be estimated in run-time utilizing an event counter that measures core performance by, for example, determining instructions per cycle (IPC) counter that may be used as an indicator of the core performance. For example, IPC may be calculated by counting core cycles of a core and a number of tasks executed and dividing the tasks by the count of the cycles. Number of tasks executed on the core may be calculated by counting a program counter that is a register that changes its value from 0 to 1 each time the core is executing a task. The IPC counter of each core may vary from system to system depending on the core architecture and therefore, other required metrics may be calculated by a micro code engine, such as an independent small core located in the socket that may be required in order to receive all the IPC metrics and determine a universal metric that may be used by the operating system in order to schedule the tasks more efficiently.

Figure 1:
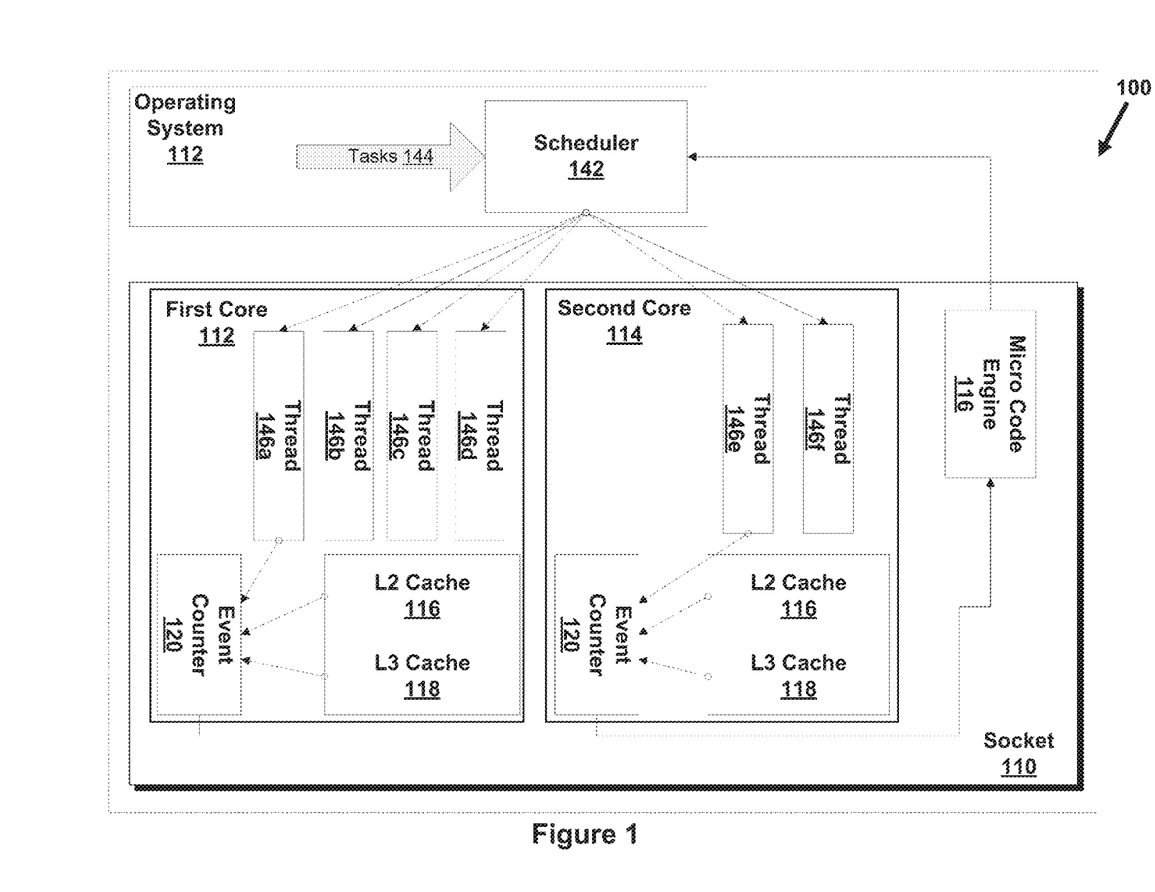
FIG. 1 illustrates a Run-Time Task Scheduling (RTTS) system, in accordance with an embodiment of the invention.

FIG. 1 illustrates an RTTS system 100 configured to receive run-time metrics representing load of the cores and distribute tasks 144 among the available threads using metrics determined by a micro code engine located on the socket.

In an example embodiment, RTTS system 100 includes an operating system 112 that transfers tasks 144 to a scheduler 142 that is distributing the tasks 144 on one of socket threads, such as thread 146a, for execution.

According to an example embodiment, socket 110 is a hardware chip that is configured to execute tasks 144 sent by scheduler 142. Socket 110 may incorporate one or more cores that are an independent processing units (CPU, processor) such as, for example, first core 112 and second core 114, and a microcode engine 116. Additionally, each core may have memory such as L2 Cache 116 and L3 Cache 118, and an event counter 120.

First core 112 and second core 114 ("the cores") are physical CPUs configured to execute tasks 144 assigned by scheduler 142. Each core may have different cache memories to store the tasks and calculation results such as L2 Cache 116 and L3 Cache 118, and an event counter 120.

The cores may be adjusted dynamically by software to run in different Simultaneous Multi-Threading (SMT) modes. As depicted in FIG. 1, first core 112 is adjusted to SMT 4 (4 threads) mode while second core 114 is adjusted to SMT 2 (2 threads) mode.

According to an example embodiment, one of the threads, such as thread 146a, is a virtual core that is configured to execute any scheduled task as if the task was assigned to one of the cores. As previously mentioned, threads may be created by time-slice usage of a single core, thus each thread of a multi-threaded processor appears to the operating system as an independent processor.

According to an example embodiment, L2 cache 116 and L3 cache 118 are separate memory components that are completely handled by the hardware and have different access speeds. For example, L2 cache 116 is attached to each core, which results in faster operating memory, whereas L3 cache 118 is a memory of bigger capacity and with slower access speed that in addition, may be shared among all the cores in socket 110. According to an example embodiment, each pair of L2 cache 116 and L3 cache 118 is associated with an individual core that is completely handled by the hardware, therefore any thread running in the same core share the same L2 cache 116 and L3 cache 118 associated with one of the cores.

In an example embodiment, event counter 120 is a set of special-purpose registers built into core to count and store the counts of hardware-related activities within each core such as counting instances whenever the memory is written, replaced and cleaned. Event counter 120 indicates usage and non-usage of cache memory by counting cache lines (data blocks of fixed size) that are prefetched (upload of requests an instruction or data from memory in advance) into the cache at the time of eviction (removal) from the cache. For example, event counter 120 counts instances when data block is either written, removed or relocated on L2 cache 118. In another embodiment, event counter 120 may determine IPC of first core 112 and IPC of second core 114.

In an example embodiment, micro code engine 116 is a small core that is configured to receive information from event counter 120 of each available core. The information received by micro code engine 116 may be a vector including the IPC counter of the core, and different level cache usage counters values (L2 and L2 cache usage values) of each core that may be used to determine a run-time load of each core. Micro code engine 116 may be programmed to calculate the run-time core load metrics (as described below) and send the metrics of each core and each socket to scheduler 142 in order to assist in effective scheduling of the tasks on each one of the threads 146a-f. In another embodiment, micro code engine 116 software and metrics may be updated by the scheduler 142 or operating system 112.

In an example embodiment, operating system 112 is a software program configured to manage the resources of the system and provide services to programs that are executed on operating system 112. Operating system 112 schedules tasks 144 for efficient use of the system and may also include accounting software for cost allocation of processor time, mass storage, printing, and other resources. Operating system 112 acts as an intermediary between programs and the computer hardware, where the application code is typically executed directly by the hardware and makes system calls to, or is interrupted by, an operating system. Operating systems are found on many devices that contain a processor such as cellular phones, video game consoles, web servers, and supercomputers.

In an example embodiment, scheduler 142 is a software component that is incorporated in operating system 112 and is configured to allocate tasks 144 for execution on one of the threads such as thread 146a. Scheduler 142 carries out the scheduling activity. Schedulers are implemented to allocate computer resources in order to keep all resources continuously operating, allow multiple users to share system resources effectively, or to achieve a target quality of service. Scheduling is fundamental to computation itself, and an intrinsic part of the execution model of a computer system and makes it possible to have computer multitasking even with a single core.

In contrast to an example embodiment of the present invention, Linux scheduler uses the Completely Fair Scheduler (CFS) scheduling algorithm. The CFS scheduler arranges the tasks in a binary tree where the priority of each task is determined by priority and time of the execution of the task on a thread. This algorithm has a scheduling complexity of O(log N), where N is the number of tasks that are waiting to be executed. In contrast to the present invention, the CFS Scheduler and other currently available schedulers do not account for the effects of other threads running in the same core and the capability to change the SMT mode of the core or to boost core speed in order to improve core performance.

Figure 2:
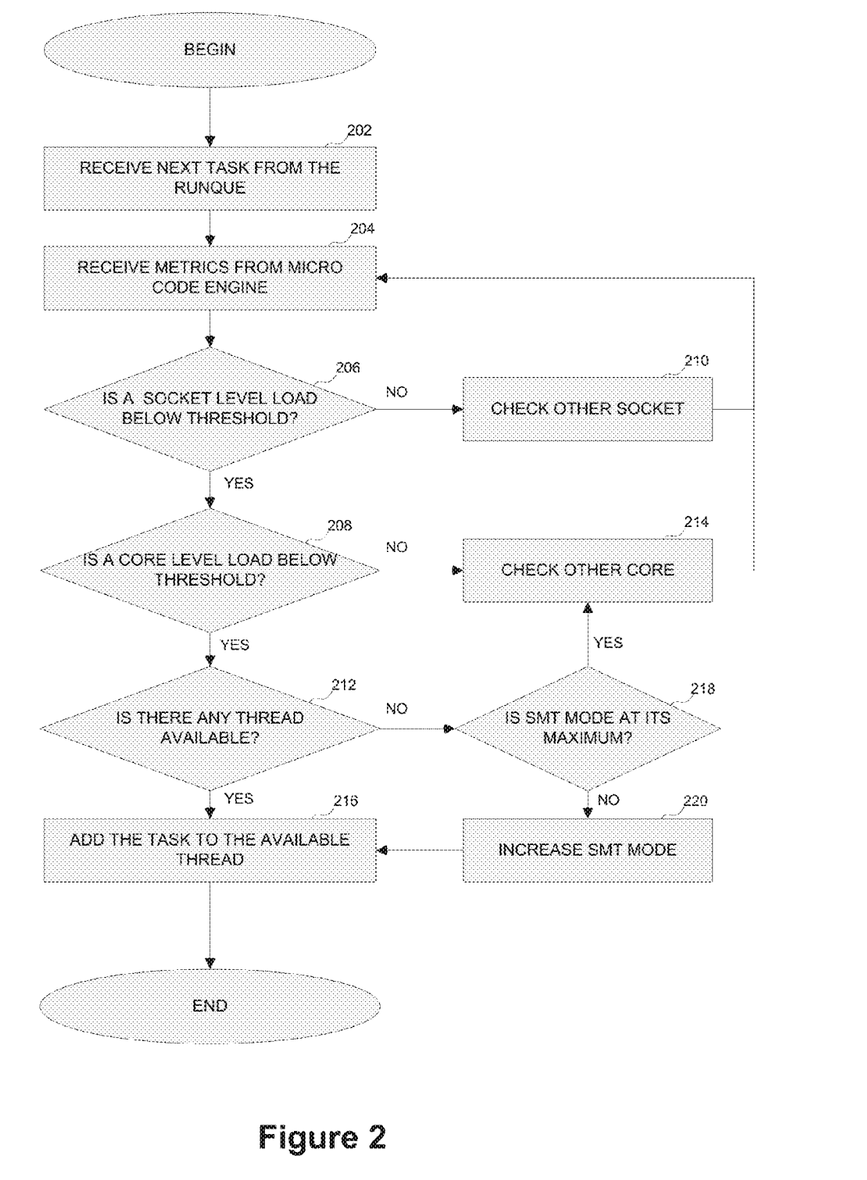
FIG. 2 is a flowchart illustrating operations of the scheduler of FIG. 1, in accordance with an embodiment of the invention.

FIG. 2 is a flowchart illustrating operations of the scheduler 142 of FIG. 1, in accordance with an embodiment of the invention. As previously described, scheduler 142 is software that is configured to receive a task and determine which the thread will execute the task.

Referring to step 202, scheduler 142 receives next task from the run queue. Run queue may be an array of tasks or a binary tree to be executed by scheduler 142. According to an example embodiment, tasks in the run queue may be prearranged using known techniques that arrange the tasks according to their priorities and other parameters, such as previously mentioned CFS scheduler in Linux operating systems.

Referring to step 204, scheduler 142 receives metrics from micro code engine 116. According to an example embodiment, microcode engine 116 is programmed to provide a run-time weighted core load of a core that scheduler 142 is inspecting. The metrics may represent a vector including a core load, memory load and SMT mode. In other embodiments, all the various parameters may be incorporated in one number representing overall core load.

Referring to decision 206, scheduler 142 determines whether a socket level load is below a threshold value. According to an example embodiment, socket level load may be determined by collecting IPC metrics from event counter 120 of each core and calculating a weighted average of each core load of the current socket using micro code engine 116. For example, if a socket has 12 cores and 6 cores are loaded by 20% and other 6 core are loaded by 40% socket level load may be 30% ((6*0.2+6*0.4)/12). In another embodiment, socket level load may be determined by analyzing cache footprint or bandwidth. According to an example embodiment, the threshold value represents a peak performance of the socket, whereby adding additional tasks to the socket will create a bottleneck and reduce performance of the socket. If a socket level load is below threshold, scheduler 142 continues to step 208 (decision 206, "Yes" branch). If a socket level load is above threshold value, scheduler 142 continues to step 210 (decision 206, "No" branch).

Referring to decision 208, scheduler 142 determines whether a core level load is below a threshold value. The core level load is determined from metrics received from microcode engine 116. For example, microcode engine 116 may determine first core 112 core level load using metric equation $LR=L_0R_0+L_1R_1y_1+L_2R_2y_2+ \ldots$ where $(R_n)$ is a weighted resource factor, $(L_j)$ is the ratio of the run time of the task in a given thread to total allotted time by the scheduler 142 and $(y_i)$ is an aging factor that increases the metrics if the given task is not executed on a given time (factor that increases the metrics based on an amount of time the task has not been executed). If a core level load is below threshold, scheduler 142 continues to step 212 (decision 208, "Yes" branch). If a core level load is above threshold value, scheduler 142 continues to step 214 (decision 208, "No" branch).

Referring to step 210, scheduler 142 checks if other sockets are available. According to an example embodiment, if a core to socket load is more than a threshold value adding tasks to any of the cores of the socket will reduce socket performance. If there is an additional socket available, scheduler 142 will receive additional socket metrics and assign the task to one of the available threads. In another embodiment, when there are no additional sockets available, scheduler 142 may dynamically boost one of the cores frequency that will be affected the most from the boost in frequency in order to execute currently running tasks faster. For example, if the tasks executed on first core 112 require processing components, without accessing slower memory located outside of the CPU, such as L2 cache 116 and L3 cache 118. Scheduler 142 may boost first core 112 frequency so that the tasks will be executed faster and free up the threads of first core 112.

Referring to decision 212, scheduler 142 determines whether there is any thread available within the core. If there is an available thread, such as thread 146a, scheduler 142 continues to step 216 (decision 212, "Yes" branch). If there are no available threads in the core to perform the task, scheduler 142 continues to decision 218 (decision 212, "No" branch).

Referring to step 214, scheduler 214, checks if there are any free threads in the cores to perform the task. As previously mentioned, if a thread to core load level is above threshold, then adding tasks to first core 112 will reduce overall performance of socket 110 and active threads of first core 112 will be executed slower. Therefore, scheduler 142 switches to second core 114 and determines whether a task may be assigned to one of the threads of second core 112. For example, if in first core 112 L2 cache 116 and L3 cache 118 are used by the currently executed threads, adding a task to an available thread in first core 112 will not increase core performance because the task may not be executed until L2 cache 116 and L3 cache are available.

Referring to step 216, scheduler 142 adds the task to the available thread. According to an example embodiment, if the core has idle threads and the core load is not above a threshold value, tasks will be added to all available threads in the core. In another embodiment, if no tasks are performed by the core, scheduler 142 will reduce SMT mode of the core in order that the next incoming task will be executed faster. For example, if there is only one task to be performed on the core, scheduler 142 will change the SMT mode to SMT 1, where the core will run in single thread mode and all the resources of the core are available to the task. In a further embodiment, reducing the SMT mode may be preferred when the nature of the task requires either fast execution (specially assigned high priority of the task) or the task to be executed requires all the resources of the core, such as when the task uses all the available L2 cache 116 or L3 cache memory in the core and additional tasks require memory allocation.

Referring to decision 218, scheduler 142 checks whether the core runs in a maximum SMT mode. According to an example embodiment, after determining that the thread to core level load is below threshold (decision 208) scheduler 142 may add a task by increasing the SMT mode. If the core is not running in a maximum SMT mode, scheduler 142 proceeds to step 220 (decision 218, "No" branch). If the SMT mode of the core is at its maximum, scheduler 142 proceeds to step 214 in order to assign the task to a thread outside of the current core (decision 218, "Yes" branch).

Referring to step 220, scheduler 142 increases the SMT mode of the core to next available SMT mode in order to free up more threads and increase the core load. For example, if the core is running in the SMT 2 mode, meaning it executes 2 threads scheduler 142 increases the mode to SMT 4 mode and adds 2 additional threads that may take additional tasks from the scheduler 142.

Figure 3:
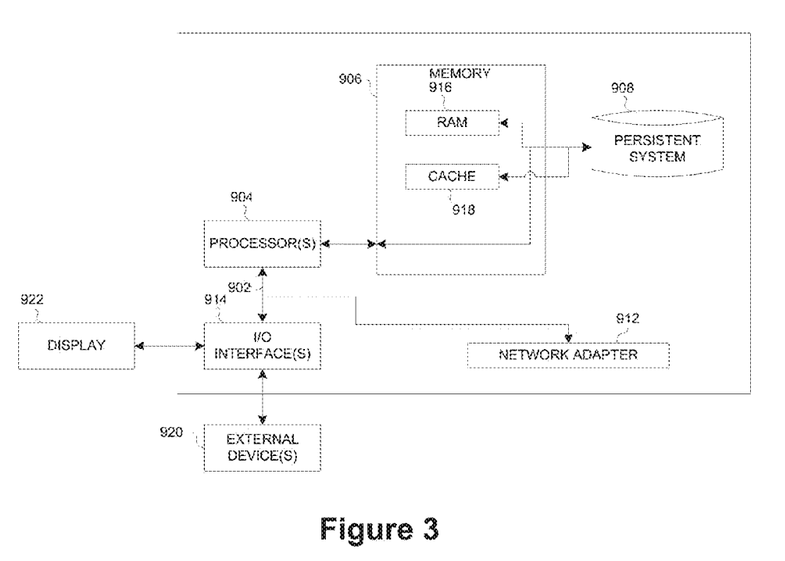
FIG. 3 is a block diagram depicting the hardware components of the RTTS system of FIG. 1, in accordance with an embodiment of the invention.

FIG. 3 depicts a block diagram of components of the RTTS system, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

An RTTS system includes communications fabric 902, which provides communications between computer processor(s) 904, memory 906, persistent storage 908, communications unit 912, and input/output (I/O) interface(s) 914. Communications fabric 902 may be implemented with any architecture designed for passing data and/or control information between processors (such as microprocessors, communications and network processors, etc.), system memory, peripheral devices, and any other hardware components within a system. For example, communications fabric 902 may be implemented with one or more buses.

Computer processor(s) 904, are based on socket(s), such as socket 110 described in FIG. 1 above.

Memory 906 and persistent storage 908 are computer-readable storage media. In this embodiment, memory 906 includes random access memory (RAM) 916 and cache memory 918. In general, memory 906 may include any suitable volatile or non-volatile computer-readable storage media.

Operating system 112 and scheduler 142 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is part of persistent storage 908.

Communications unit 912, in these examples, provides for communications with other data processing systems or devices. In these examples, communications unit 912 includes one or more network interface cards. Communications unit 912 may provide communications using one or both of physical and wireless communications links. Call screening program 112 may be downloaded to persistent storage 908 through communications unit 912.

I/O interface(s) 914 allows for input and output of data with other devices that may be connected to smartphone 110 and server 140. For example, I/O interface 914 may provide a connection to external devices 920 such as a keyboard, keypad, a touch screen, and/or some other suitable input device. External devices 920 may also include portable computer-readable storage media such as, for example, thumb drives, portable optical or magnetic disks, and memory cards. Software and data used to practice embodiments of the present invention, e.g., call screening program 112 may be stored on such portable computer-readable storage media and may be loaded onto persistent storage 908 via I/O interface(s) 914. I/O interface(s) 914 may also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A computer-implemented method for run-time task scheduling on a socket, the method comprising:
    allocating, by a scheduling module in an operating system, a task to a socket, wherein the socket comprises a plurality of processor cores and a micro code engine, wherein the micro code engine is an independent core configured to determine run-time core load metrics for the scheduling module;
    receiving, by the scheduling module, metrics from the micro code engine, wherein the metrics are calculated by the micro code engine based on data received from an event counter located on each of the plurality of processor cores, wherein the event counter determines instructions per cycle by counting core cycles of each one of the plurality of processor cores and a number of tasks executed by each one of the plurality of processor cores and dividing the counted number of tasks by the counted core cycles;
    determining, by the scheduling module, whether a socket level load is below a socket threshold value, wherein the socket level load is determined from the metrics received from the micro code engine;
    based on determining that the socket level load is below the socket threshold value, determining, by the scheduling module, whether a core level load for each processor core is below a core threshold value, wherein the core level load for each processor core is determined from the metrics received from the micro code engine;
    based on determining that the core level load for a processor core is below the core threshold value, determining, by the scheduling module, whether there is an available thread on the processor core; and based on determining that there is an available thread, assigning, by the scheduling module, the task to the available thread; and
    based on determining that a nature of the task requires a fast execution, decreasing a Simultaneous Multi-Threading mode of the processor core to decrease a number of threads simultaneously running on the processor core.

2. The method of claim 1, wherein the micro code engine only receives data from the event counter and calculates the metrics.

3. The method of claim 1 further comprising updating, by the scheduling module, an algorithm for determining the metrics on the micro code engine.

4. The method of claim 1, wherein the metrics are calculated based on the data received by the micro code engine from the event counter located on each of the plurality of processor cores and data received by the micro code engine from a plurality of cache memories located in the socket.

5. The method of claim 1, further comprising:
    based on determining that there is no available thread, determining whether a Simultaneous Multi-Threading (SMT) mode may be increased; and
    based on determining that the SMT mode may be increased, increasing the SMT mode of the core.

6. The method of claim 1, wherein the metrics of the event counter is based on counting instructions per cycle of a core, and wherein counting the instructions per cycle of the core comprises:
    counting one or more cycles;
    counting a program counter; and
    determining the instructions per cycle of the core based on averaging the program counter by the one or more cycles, wherein program counter is a register that changes its value from 0 to 1 each time the core is executing a task.

7. The method of claim 1, wherein the metrics are determined using an equation $LR = L_0 R_0 + L_1 R_1 y_1 + L_2 R_2 y_2 + \ldots$ where $(R_n)$ is a weighted resource factor, $(L_j)$ is a ratio of the run time of the task in the thread to total allotted time by a scheduling module and $(y_j)$ is an aging factor that increases based on an amount of time a task has not been executed.

8. A computer program product for run-time task scheduling on a socket, computer program product comprising:
    one or more computer-readable storage devices and program instructions stored on at least one of the one or more tangible storage devices, comprising:
    program instructions to allocate, by a scheduling module in an operating system, a task to a socket, wherein the socket comprises a plurality of processor cores and a micro code engine, wherein the micro code engine is an independent core configured to determine run-time core load metrics for the scheduling module;
    program instructions to receive, by the scheduling module, metrics from the micro code engine, wherein the metrics are calculated by the micro code engine based on data received from an event counter located on each of the plurality of processor cores, wherein the event counter determines instructions per cycle by counting core cycles of each one of the plurality of processor cores and a number of tasks executed by each one of the plurality of processor cores and dividing the counted number of tasks by the counted core cycles;
    program instructions to determine, by the scheduling module, whether a socket level load is below a socket threshold value, wherein the socket level load is determined from the metrics received from the micro code engine;

based on determining that the socket level load is below the socket threshold value, program instructions to determine, by the scheduling module, whether a core level load for each processor core is below a core threshold value, wherein the core level load for each processor core is determined from the metrics received from the micro code engine;

based on determining that the core level load for a processor core is below the core threshold value, program instructions to determine, by the scheduling module, whether there is an available thread on the processor core; and based on determining that there is an available thread, program instructions to assign, by the scheduling module, the task to the available thread; and based on determining that a nature of the task requires a fast execution, program instructions to decrease a Simultaneous Multi-Threading mode of the processor core to decrease a number of threads simultaneously running on the processor core.

9. The computer program product of claim 8, wherein the micro code engine only receives data from the event counter and calculates the metrics.

10. The computer program product of claim 8 further comprising program instructions to update, by the scheduling module, an algorithm for determining the metrics on the micro code engine.

11. The computer program product of claim 8, wherein the metrics are calculated based on the data received by the micro code engine from the event counter located on each of the plurality of processor cores and data received by the micro code engine from a plurality of cache memories located in the socket.

12. The computer program product of claim 8 further comprising:

based on determining that there is no available thread, program instructions to determine whether a Simultaneous Multi-Threading (SMT) mode may be increased; and based on determining that the SMT mode may be increased, program instructions to increase the SMT mode of the core.

13. The computer program product of claim 8, wherein the metrics of the event counter is based on counting instructions per cycle of a core, and wherein counting the instructions per cycle of the core comprises:

program instructions to count one or more cycles;

program instructions to count a program counter; and program instructions to determine the instructions per cycle of the core based on averaging the program counter by the one or more cycles, wherein program counter is a register that changes its value from 0 to 1 each time the core is executing a task.

14. The computer program product of claim 8, wherein the metrics are determined using an equation $LR = L_0 R_0 + L_1 R_1 y_1 + L_2 R_2 y_2 + \ldots$ where $(R_n)$ is a weighted resource factor, $(L_j)$ is a ratio of the run time of the task in the thread to total allotted time by a scheduling module and $(y_i)$ is an aging factor that increases based on an amount of time a task has not been executed.

15. A computer system for run-time task scheduling on a socket, the computer system comprising:

one or more processors, one or more computer-readable memories, one or more computer-readable tangible storage devices, and program instructions stored on at least one of the one or more storage devices for execution by at least one of the one or more processors via at least one of the one or more memories, comprising:

program instructions to allocate, by a scheduling module in an operating system, a task to a socket, wherein the socket comprises a plurality of processor cores and a micro code engine, wherein the micro code engine is an independent core configured to determine run-time core load metrics for the scheduling module;

program instructions to receive, by the scheduling module, metrics from the micro code engine, wherein the metrics are calculated by the micro code engine based on data received from an event counter located on each of the plurality of processor cores, wherein the event counter determines instructions per cycle by counting core cycles of each one of the plurality of processor cores and a number of tasks executed by each one of the plurality of processor cores and dividing the counted number of tasks by the counted core cycles;

program instructions to determine, by the scheduling module, whether a socket level load is below a socket threshold value, wherein the socket level load is determined from the metrics received from the micro code engine;

based on determining that the socket level load is below the socket threshold value, program instructions to determine, by the scheduling module, whether a core level load for each processor core is below a core threshold value, wherein the core level load for each processor core is determined from the metrics received from the micro code engine;

based on determining that the core level load for a processor core is below the core threshold value, program instructions to determine, by the scheduling module, whether there is an available thread on the processor core; and based on determining that there is an available thread, program instructions to assign, by the scheduling module, the task to the available thread; and based on determining that a nature of the task requires a fast execution, program instructions to decrease a Simultaneous Multi-Threading mode of the processor core to decrease a number of threads simultaneously running on the processor core.

16. The computer system of claim 15, wherein the micro code engine only receives data from the event counter and calculates the metrics.

17. The computer system of claim 15 further comprising program instructions to update, by the scheduling module, an algorithm for determining the metrics on the micro code engine.

18. The computer system of claim 15, wherein the metrics are calculated based on the data received by the micro code engine from the event counter located on each of the plurality of processor cores and data received by the micro code engine from a plurality of cache memories located in the socket.

19. The computer system of claim 15 further comprising:

based on determining that there is no available thread, program instructions to determine whether a Simultaneous Multi-Threading (SMT) mode may be increased; and based on determining that the SMT mode may be increased, program instructions to increase the SMT mode of the core.

20. The computer system of claim 15 wherein the metrics of the event counter is based on counting instructions per cycle of a core, and wherein counting the instructions per cycle of the core comprises:
- program instructions to count one or more cycles;
- program instructions to count a program counter; and
- program instructions to determine the instructions per cycle of the core based on averaging the program counter by the one or more cycles, wherein program counter is a register that changes its value from 0 to 1 each time the core is executing a task.

\* \* \* \* \*